US008375205B2

(12) United States Patent
Johnston

(10) Patent No.: US 8,375,205 B2
(45) Date of Patent: Feb. 12, 2013

(54) TECHNIQUES FOR COMMUNICATING INFORMATION OVER MANAGEMENT CHANNELS

(75) Inventor: David Johnston, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1218 days.

(21) Appl. No.: 11/864,123

(22) Filed: Sep. 28, 2007

(65) Prior Publication Data

US 2009/0089576 A1    Apr. 2, 2009

(51) Int. Cl.
H04L 29/06 (2006.01)
(52) U.S. Cl. ........ 713/160; 713/153; 713/168; 380/247; 380/270
(58) Field of Classification Search .................. None
See application file for complete search history.

(56) References Cited

U.S. PATENT DOCUMENTS

| 2004/0181811 | A1* | 9/2004 | Rakib | 725/122 |
| 2007/0058544 | A1* | 3/2007 | Kim et al. | 370/230 |
| 2008/0044012 | A1* | 2/2008 | Ekberg et al. | 380/30 |

FOREIGN PATENT DOCUMENTS

| CN | 1239855 A | 12/1999 |
| EP | 0957598 A2 | 11/1999 |
| EP | 1758310 A1 | 2/2007 |
| EP | 2043397 A2 | 1/2009 |
| EP | 2043397 A3 | 1/2011 |
| WO | 2005091566 A1 | 9/2005 |

OTHER PUBLICATIONS

European Search Report received for the European Patent Application No. 08165343.8, completed on Nov. 30, 2010, 2 pages.

* cited by examiner

Primary Examiner — Shewaye Gelagay
(74) Attorney, Agent, or Firm — Kacvinsky Daisak PLLC

(57) ABSTRACT

Techniques for communicating information over management channels are described. An apparatus may comprise a classifier module operative to classify management information for a wireless communications network as media access control security management information or media access control management information. The apparatus may further comprise a wireless transceiver to couple to the classifier module, the wireless transceiver operative to communicate the media access control security management information over an insecure management connection and the media access control management information over a secure management connection. Other embodiments are described and claimed.

17 Claims, 5 Drawing Sheets

100

202

| Message Type 212 | Nonce 214 | Message Type 216 | Message Header 218 | Type Length Value 220 | Integrity Check Value 222 |

←——Encrypted Management Information——→

| Nonce 214 | Message Type 216 | Message Header 218 | Type Length Value 220 | Integrity Check Value 222 |

←——Encrypted Management Information——→

| Message Type 212 | Protection Type Length Value 230 | Nonce 214 | Message Type 216 | Message Header 218 | Type Length Value 220 | Integrity Check Value 222 |

←——Encrypted Management Information——→

| Generic MAC Header 240 | Nonce 214 | Message Type 216 | Message Header 218 | Type Length Value 220 | Integrity Check Value 222 |

←——Encrypted Management Information——→

> CLASSIFY MANAGEMENT INFORMATION FOR A WIRELESS COMMUNICATIONS NETWORK AS MEDIA ACCESS CONTROL SECURITY MANAGEMENT INFORMATION OR MEDIA ACCESS CONTROL MANAGEMENT INFORMATION
> 402

> COMMUNICATE THE MEDIA ACCESS CONTROL SECURITY MANAGEMENT INFORMATION OVER AN INSECURE MANAGEMENT CONNECTION AND THE MEDIA ACCESS CONTROL MANAGEMENT INFORMATION OVER A SECURE MANAGEMENT CONNECTION
> 404

FIG. 4

TECHNIQUES FOR COMMUNICATING INFORMATION OVER MANAGEMENT CHANNELS

BACKGROUND

A communications system typically communicates sensitive information that is confidential and should be protected while in communication or at the endpoints. A wireless communications system may be particularly vulnerable since an unauthorized party may simply monitor a wireless communication medium such as portions of the radio-frequency (RF) spectrum to gather such sensitive information. As a result, wireless communications systems typically implement various security techniques to protect sensitive information from unauthorized access, particularly while in transit. Many security techniques, however, provide only partial and incomplete protection for the sensitive information. Consequently, improvements to security techniques may result in increased protection for a communications system in general and sensitive information in particular. Furthermore, improvements to security techniques may result in more efficient use of network or endpoint resources, such as communication bandwidth, memory, processing cycles, power consumption, throughput and so forth. Accordingly, there may be a substantial need for improved security techniques to enhance performance of a communications system.

BRIEF DESCRIPTION OF THE DRAWINGS

FIG. 2A illustrates one embodiment of a first management packet.

FIG. 2B illustrates one embodiment of a second management packet.

FIG. 2C illustrates one embodiment of a third management packet.

FIG. 2D illustrates one embodiment of a fourth management packet.

FIG. 4 illustrates one embodiment of a logic diagram.

DETAILED DESCRIPTION

Figure 1:
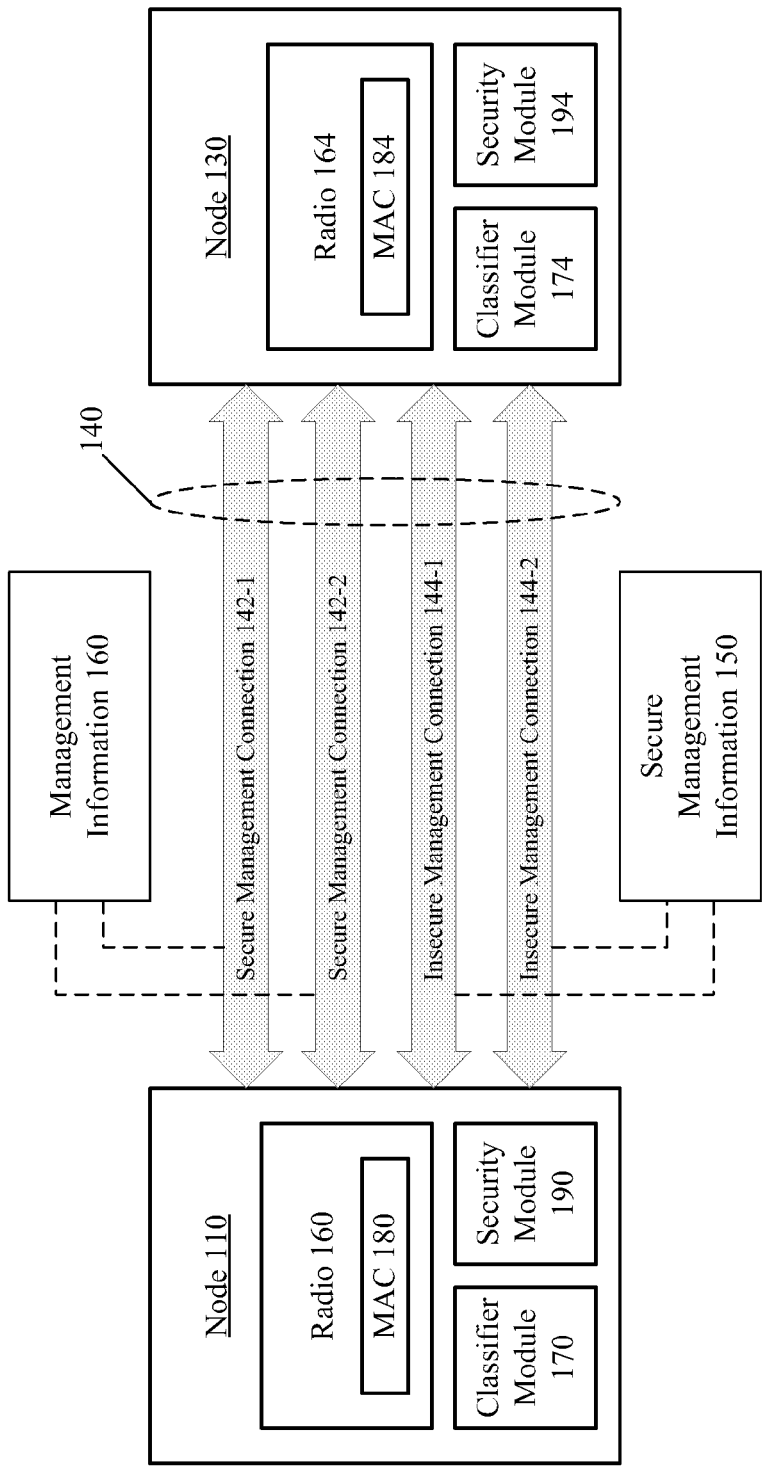
FIG. 1 illustrates one embodiment of a network.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are generally directed to improvements for wireless communications systems. Some embodiments are particularly directed to techniques for communicating management information over management channels for a wireless communications system. Examples of wireless communication systems include without limitation systems compliant with various Institute of Electrical and Electronics Engineers (IEEE) standards, such as the IEEE 802.11 standards for Wireless Local Area Networks (WLANs), the IEEE 802.16 standards for Wireless Metropolitan Area Networks (WMANs), and the IEEE 802.20 or Mobile Broadband Wireless Access (MBWA), among others. For example, the Worldwide Interoperability for Microwave Access (WiMAX) is a wireless broadband technology based on the IEEE 802.16 standard of which IEEE 802.16-2004 and the 802.16e amendment (802.16e-2005) are Physical (PHY) layer specifications. In one embodiment, for example, some embodiments may be described and implemented with reference to the IEEE 802.16 Draft Standard for Local and Metropolitan Networks titled "Part 16: Air Interface for Broadband Wireless Access Systems," P802.16Rev2/D0b (Revision of IEEE Standard 802.16-2004, as amended by IEEE Standard 802.16f-2005 and IEEE Standard 802.16e-2005), dated Jun. 27, 2007 ("WiMAX Specification"), and its progeny, revisions and variants. The WiMAX Specification specifies the air interface, including the medium access control (MAC) and physical layer (PHY), of combined fixed and mobile point-to-multipoint broadband wireless access (BWA) systems providing multiple services. The MAC is structured to support multiple PHY specifications, each suited to a particular operational environment. In one embodiment, for example, some embodiments may be described and implemented with reference to the IEEE 802.16 Baseline Document for Draft Standard for Local and Metropolitan Area Networks titled "Part 16: Air Interface for Broadband Wireless Access Systems, Multihop Relay Specification," 802.16j-06/026r4, dated Jun. 6, 2007 ("IEEE 802.16 Baseline Specification"), and its progeny, revisions and variants. Although some embodiments may be described with reference to the WiMAX Specification and the IEEE 802.16 Baseline Specification by way of example and not limitation, it may be appreciated that various embodiments may be implemented for other wireless communications systems as well.

A wireless communications system typically communicates sensitive information that is confidential and should be protected while in communication and at the endpoints. Conventional security techniques, however, are unsatisfactory for a number of reasons. For example, some wireless communications systems attempt to only protect the sensitive information and not control information used to communicate the sensitive information, such as header information. In another example, some wireless communications systems may communicate security information used to encrypt and decrypt the sensitive information within the same communications channel as the sensitive information. This may create race conditions when packets of encrypted sensitive information arrive at an endpoint before the necessary security information to decrypt the sensitive information arrives, thereby potentially causing packet loss. In yet another example, some wireless communications systems may attempt to protect sensitive information using one security technique when the sensitive information is already protected by another security technique. Such redundant protection may unnecessarily consume finite network or endpoint resources, such as bandwidth, memory, processing cycles, power consumption, throughput and so forth.

Various embodiments may solve these and other problems. Various embodiments define and utilize novel management connections to supplement or augment existing management connections to enhance communications of management information between nodes of a wireless communications network. In one embodiment, an apparatus such as a node may include a radio or wireless transmitter/receiver ("transceiver") and a classifier module. The classifier module may be operative to classify management information for a wireless communications network. Examples of management information may include MAC management messages of varying management message types as defined by the WiMAX Specification and/or the IEEE 802.16 Baseline Specification. For example, the classifier module may classify management information as MAC security management information or MAC management information. The MAC security management information may represent any management information used for implementing or managing a given security technique for the wireless communications network, such as MAC privacy key management (PKM) information. Examples of MAC PKM messages may include without limitation a PKM request (PKM-REQ) and a PKM response (PKM-RSP) for respective management message types 9, 10. The MAC management information may represent all other forms of management information used by the wireless communications network, such as power management messages, hand-off information, frequency information, configuration information, and so forth. The wireless transceiver may couple to the classifier module, and the wireless transceiver may be operative to communicate the MAC security management information over one or more insecure management connections and the MAC management information over one or more secure management connections. In this manner, a node may communicate management information in a protected manner by encrypting management traffic that includes both sensitive information (e.g., payload information) and control information used to communicate the sensitive information (e.g., header information), while reducing or eliminating potential problems such as creating race conditions by sending PKM information over a secure channel, encrypting PKM information that is already secure, sending PKM information with unprotected control information, and so forth. Other embodiments are described and claimed.

FIG. 1 illustrates one embodiment of a network 100. The network 100 may comprise multiple nodes, such as nodes 110, 130. A node generally may comprise any physical or logical entity for communicating information in the network 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the nodes 110, 130 may be arranged to communicate control information and media information over wireless shared media 140. In the illustrated embodiment, the node 110 may comprise a wireless transmitter node designated as a source (S) node, and the node 130 may comprise a wireless receiver node designated as a destination (D) node. A more detailed block diagram and description for the nodes 110, 130 are provided below with reference to FIGS. 3 and 4.

In various embodiments, the S node 110 may represent any transmitting node. In one embodiment, for example, the S node 110 may represent a network point of attachment. A network point of attachment may comprise any device capable of acting as a communication hub for wireless client devices to connect to a wired network from a wireless network. Network points of attachment may include, but are not necessarily limited to, a wireless access point (AP), a WiFi or WLAN AP (e.g., hotspots), a WiMAX wireless broadband base station, a cellular base station, a Node B, a relay station, a mobile subscriber center, a radio network controller, a router, a switch, a bridge, a gateway, and any other device capable of acting as a communication hub for wireless client devices to connect to a wired network from a wireless network and to extend the physical range of service of a wireless network. The embodiments are not limited in this context.

In one embodiment, for example, the D node 130 may represent any receiving node. In one embodiment, for example, the D node 130 may represent a wireless client device. A wireless client device may include any electronic device having wireless capabilities, including a processing system, a computer system, a computer sub-system, a computer, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a subscriber station (SS), a relay station, a microprocessor, an integrated circuit such as an application specific integrated circuit (ASIC), a programmable logic device (PLD), a processor such as general purpose processor, a digital signal processor (DSP) and/or a network processor, and so forth. The embodiments are not limited in this context.

It is worthy to note that although a given node 110, 130 may be designated a transmitting node or receiving node in various embodiments by way of example, such designations are provided for sake of clarity and not limitation. It may be appreciated that either node 110 or 130 may comprise a transmitting node or receiving node. In some cases, the nodes 110, 130 may each comprise both a transmitting node and a receiving node. For example, the nodes 110, 130 may each be equipped with a wireless transceiver, along with associated wireless equipment typically implemented for a wireless communication device (e.g., antennas, amplifiers, filters, processors, and so forth), thereby providing both nodes 110, 130 with transmitting and receiving capabilities.

In various embodiments, the nodes 110, 130 may include respective security modules 190, 194. The security modules 190, 194 may be arranged to implement any number of security techniques to protect information communicated between the nodes 110, 130. In one embodiment, for example, the security modules 190, 194 may be arranged to implement data encryption and decryption in accordance with the Advanced Encryption Standard (AES) in Counter with Cipher Block Chaining Message Authentication Code (CBC-MAC) (CCM) mode as defined by IEEE RFC 3610 and implemented by the WiMAX Specification and the IEEE 802.16 Baseline Specification. Other security techniques may be implemented by the security modules 190, 194 as well as desired for a given operational environment.

In various embodiments, the nodes 110, 130 may include respective wireless transceivers or radios 160, 164. As used herein, the terms "wireless transceiver" and "radio" may be synonymous or interchangeable. The radios 160, 164 may be arranged to perform PHY layer and/or MAC layer operations to communicate information over the wireless shared media 140. The radios 160, 164 may be compliant with one or more wireless communication standards, such as standards promulgated by IEEE, the Internet Engineering Task Force (IETF), the International Telecommunications Union (ITU), the Joint Technical Committee (JTC) of European Telecommunications Standards Institute (ETSI), the European Committee for Electrotechnical Standardization (CENELEC), the European Broadcasting Union (EBU), and so forth. In various embodiments, the radios 160, 164 may be compliant with one or more IEEE 802.XX standards including IEEE 802.11 standards (e.g., 802.11a, b, g, h, j, m, n, and progeny, revisions or variants), the IEEE 802.16 standards (e.g., 802.16-2004, 802.16.2-2004, 802.16e-2005, 802.16f, and progeny, revisions or variants), the IEEE 802.20 standards and progeny, revisions or variants, and so forth. In various embodiments, the radios 160, 164 may also be compliant with one or more Digital Video Broadcasting (DVB) standards including the ETSI Digital Video Broadcasting Terrestrial (DVB-T) broadcasting standards and variants, the DVB Handheld (DVB-H) broadcasting standards and variants, the Digital Multimedia Broadcasting (DMB) broadcasting standards and variants. In one embodiment, the radios 160, 164 may be compliant with the WiMAX Specification by way of example and not limitation. The embodiments, however, are not limited to this example.

In various embodiments, the radios 160, 164 may communicate information over wireless shared media 140. The wireless shared media 140 may comprise one or more allocations of RF spectrum. The allocations of RF spectrum may be contiguous or non-contiguous. The radios 160, 164 may implement various types of PHY layer functionality to communicate information over the wireless shared media 140 using various multicarrier techniques utilized by, for example, WiMAX or WiFi systems. For example, the radios 160, 164 may utilize MIMO techniques to perform beam forming, spatial diversity or frequency diversity, as described in more detail with reference to FIG. 3. The radios 160, 164 may include various communications elements used to support wireless communications, such as the respective MAC controllers or processors 180, 184. The MAC processors 180, 184 may implement various types of MAC layer functionality for the respective nodes 110, 130.

In various embodiments, the radios 160, 164 may establish various communications channels or connections between the nodes 110, 130. In some embodiments, the radios 160, 164 may establish various types of communications connections, including management channels or connections to communicate management information, and transport channels or connections to communicate media information. Management information may refer to any data representing commands, instructions or control words meant to control or manage an automated system. For example, management information may be used to establish communications connections, route media information through a system, or instruct a node to process the media information in a predetermined manner. In one embodiment, for example, the management information may include the full range of media access control (MAC) messaging, signaling plane messaging, control plane messaging, and so forth. With respect to MAC messaging, the management information may refer to the various types of management messages defined by the WiMAX Specification and the IEEE 802.16 Baseline Specification. Media information generally may refer to any data representing content meant for a user, such as user data, image information, video information, graphical information, audio information, voice information, textual information, numerical information, alphanumeric symbols, character symbols, and so forth.

In various embodiments, the management connections may include one or more secure management connections 142-1-m, where m may represent any integer. In some embodiments, the secure management connections 142-1-m may comprise or be implemented in accordance with the WiMAX Specification and the IEEE 802.16 Baseline Specification. For example, the secure management connections 142-1-m may comprise a primary management connection (PMC) 142-1 and a basic connection or basic management connection (BMC) 142-2. The PMC 142-1 is a management connection established during initial subscriber station (SS) ranging and is used to transport delay-tolerant MAC layer management messages. The BMC 142-2 is a management connection established during SS initial ranging and is used to transport delay-intolerant MAC layer management messages.

The secure management connections 142-1, 142-2 are secure management connections since any information transported over the secure management connections 142-1, 142-2 are encrypted using a security technique implemented by the security modules 190, 194, such as AES in CCM mode, for example. The radios 160, 164 may implement management frame protection (MFP) techniques defined in the IEEE 802.16 Baseline Specification to encrypt and decrypt management information communicate over the secure management connections 142-1, 142-2. Current proposals for the MFP technique, however, calls for enciphering and deciphering management information for the secure management connections 142-1, 142-2 using privacy keys derived from protocols actually running over the secure management connections 142-1, 142-2. This potentially breaks the protocol and introduces race hazards on privacy key installations by the nodes 110, 130. Furthermore, current proposals for the MFP technique apply security only across the management message and not the entire MAC packet data unit (MPDU). As a result, the MPDU header and sub-headers on the secure management connections 142-1, 142-2 are not protected in any way.

To solve these and other problems, various embodiments may implement one or more novel insecure management connections 144-1-n, where n may represent any integer, in addition to the secure management connections 142-1-m. As with the secure management connections 142-1-m, the insecure management connections 144-1-n may comprise an insecure PMC 144-1 and an insecure basic connection or BMC 144-2. The insecure PMC 144-1 and the insecure BMC 144-2 may be the same or similar to the respective secure PMC 142-1 and secure BMC 142-2. By way of contrast, however, the insecure management connections 144-1, 144-2 are not necessarily designed to communicate encrypted traffic. For example, traffic mapped to the insecure management connections 144-1, 144-2 may be encrypted but are not encrypted specifically for transport over the insecure management connections 144-1, 144-2. Rather, the insecure management connections 144-1, 144-2 are designed to communicate security management information, such as MAC security management information as defined by the WiMAX Specification and the IEEE 802.16 Baseline Specification. For example, the MAC security management information may include PKM information or messages from a PKM protocol. The PKM protocol may comprise a client/server module between a base station (BS) and a subscriber station (SS) that is used to secure distribution of keying material. Since the MAC security management information is typically encrypted already, the MAC security management information may be communicated on an unciphered channel. All other types of management information may be communicated over the secure management connections 142-1, 142-2.

Various embodiments may utilize the secure management connections 142-1-m and the insecure management connections 144-1-n to enhance communications of management information between nodes of the wireless communications network 100. In some embodiments, for example, the nodes 110, 130 may include the respective classifier modules 170, 174. The classifier modules 170, 174 may be arranged to implement various types of classification rules designed to classify different types of management information for the wireless communications network 100. The classification rule may directly or indirectly uniquely map a packet to its management connection. In one embodiment, for example, the classifier modules 170, 174 may classify management information as MAC security management information 150 or MAC management information 160. The MAC security management information 150 may represent any management information used for implementing or managing a given security technique for the wireless communications network 100, such as PKM information. The MAC management information 160 may represent all other forms of management information used by the wireless communications network 100, such as power management messages, hand-off information, frequency information, configuration information, and so forth. The radios 160, 164 may couple to the respective classifier modules 170, 174. The radios 160, 164 may be operative to communicate the MAC security management information 150 over one or more insecure management connections 144-1-n (e.g., 144-1 and/or 144-2), and the MAC management information 160 over one or more secure management connections 142-1-m (e.g., 142-1 and/or 142-2).

To reduce or prevent the need for special setup protocol operations for the insecure management connections 144-1-n, the radios 160, 164 may establish the insecure management connections 144-1-n synchronously or substantially synchronously with the secure management connections 142-1-m. This may be accomplished by defining a connection identifier (CID) for each of the insecure management connections 144-1-n using defined offset values from a CID for each of the secure management connections 142-1-m. In one embodiment, for example, the secure PMC 142-1 may have a primary management CID, and the insecure PMC 144-1 may have an insecure primary management CID comprising a primary offset value x from the primary management CID, where x represents any integer. For example, if the secure PMC 142-1 has a primary management CID of 1000, and x is set to one (1), then the insecure PMC 144-1 may have an insecure primary management CID of 1001. Similarly, the secure BMC 142-2 may have a basic management CID, and the insecure BMC 144-2 may have an insecure basic management CID comprising a basic offset value y from the basic management CID, where y represents any integer. For example, if the secure BMC 142-2 has a basic management CID of 2000, and y is set to one (1), then the insecure BMC 144-2 may have an insecure basic management CID of 2001.

With the addition of the insecure management connections 144-1-n, the security modules 190, 194 of the respective nodes 110, 130 may encrypt and decrypt any MPDU, including a MAC control header and a MAC payload with the MAC management information, prior to communicating the MAC management information over the secure management connections 142-1-m. For example, this may be applied to any MPDU carrying management traffic not classified for communication over the insecure management connections 144-1-n. Examples of possible packet formats for packets implemented using MFP and suitable for communications over the secure management connections 142-1-m may be described with reference to FIGS. 2A-D.

FIG. 2A illustrates one embodiment of a management packet 202. The management packet 202 may represent an example of a new message type to encapsulate a protected management MPDU (MMPDU) or a management MAC Service Data Unit (MSDU) (MMSDU) after encryption by the security modules 190, 194. As shown in FIG. 2A, the management packet 202 may have a packet format with various defined fields designed to carry or communicate corresponding parameters. For example, the management packet 202 may include a message type 212, a nonce 214, a message type 216, a message header 218, a type length value (TLV) 220, and an integrity check value (ICV) 222. The message type 212 may comprise a message type value used to identify the management packet 202 as a new management message type that is protected by a security technique. The nonce 214 may comprise a number or bit string that is used only once. For example, the nonce parameter 214 may comprise a random or pseudo-random number issued in an authentication protocol to ensure that old communications cannot be reused in replay attacks. The message type 216 may comprise a message type as defined by the WiMAX Specification or the IEEE 802.16 Baseline Specification. The message header 218 may comprise a message specific header for a given message type 216. The TLV 220 may comprise: (1) a type comprising a numeric code which indicates the kind of field that this part of the message represents; (2) a length comprising the size of the value field (typically in bytes); and (3) a value comprising variable sized set of bytes which contains data for this part of the message. The ICV 222 may comprise a checksum or message footprint that allows an information technology system to detect changes or errors in data, thus ensuring data integrity. One-way hash functions are used to calculate the ICV 222 as part of the error-checking process. Suitable hash functions include 128-bit Message Digest 5 (MD5) and 160-bit Secure Hash Algorithm (SHA-1). The ICV 222 is typically used in Hash Message Authentication Code (HMAC) algorithms. In this case, the size of the HMAC output is typically the same as that of the underlying hash function (e.g., 128 or 160 bits in the case of MD5 and SHA-1), although it can be truncated if desired. For the management packet 202, the message type 216, message header 218 and the TLV 220 may be protected by the security modules 190, 194 to form encrypted management information.

FIG. 2B illustrates one embodiment of a management packet 204. The management packet 204 may represent an example of a new frame format where the header indicates protection for a MMPDU or a MMSDU after encryption by the security modules 190, 194. As shown in FIG. 2B, the management packet 204 may have a packet format with various defined fields designed to carry or communicate corresponding parameters. For example, the management packet 204 may include the fields and/or parameters 214, 216, 218, 220 and 222 as described with reference to the management packet 202, but omits the message type 212. This may be more byte efficient as compared to other frame formats. For the management packet 204, the message type 216, message header 218 and the TLV 220 may be protected by the security modules 190, 194 to form encrypted management information.

FIG. 2C illustrates one embodiment of a management packet 206. The management packet 206 may represent an example of a new secure encapsulation TLV for use in a new message type for a MMPDU or a MMSDU after encryption by the security modules 190, 194. As shown in FIG. 2C, the management packet 206 may have a packet format with various defined fields designed to carry or communicate corresponding parameters. For example, the management packet 206 may include the fields and/or parameters 212, 214, 216, 218, 220 and 222 as described with reference to the management packets 202, 204. In addition, the management packet 206 may include a new protection TLV 230 indicating the MMPDU or MMSDU has been encapsulated. For the management packet 206, the message type 216, message header 218 and the TLV 220 may be protected by the security modules 190, 194 to form encrypted management information.

FIG. 2D illustrates one embodiment of a management packet 208. The management packet 208 may represent an example of a new frame format where an existing MMPDU or a MMSDU is encrypted by the security modules 190, 194. For example, the existing link cipher implemented for the security modules 190, 194 may be applied to a MMPDU or a MMSDU after the respective classifier modules 170, 174 separates or maps traffic to the secure management connections 142-1-m. As shown in FIG. 2D, the management packet 208 may have a packet format with various defined fields designed to carry or communicate corresponding parameters. For example, the management packet 208 may include the fields and/or parameters 214, 216, 218, 220 and 222 as described with reference to the management packet 204, with the addition of a generic MAC header (GMH) 240. The presence of the GMH 240 may indicate that the management packet 208 is, for example, an MPDU. For example, the GMH 240 may contain details of the MPDU, such as the CID that defines the connection that this packet is servicing, the length of the frame and bits to qualify the presence of the cyclic redundancy check (CRC), sub headers and whether or not the payload is encrypted and if so, with which key. For the management packet 208, the message type 216, message header 218 and the TLV 220 may be protected by the security modules 190, 194 to form encrypted management information.

Figure 3:
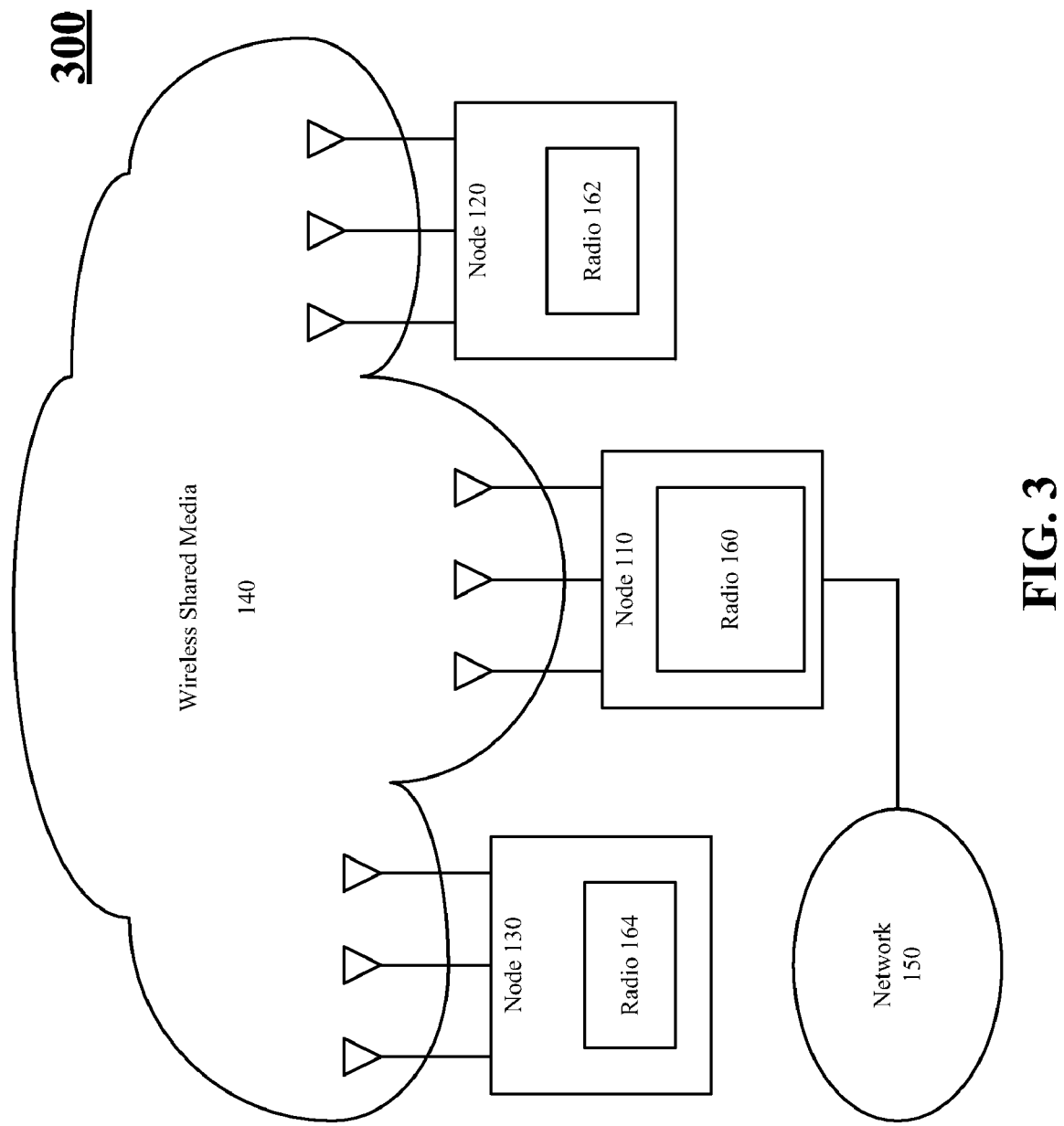
FIG. 3 illustrates one embodiment of a communications system.

FIG. 3 illustrates one embodiment of a communications system 300 implementation of the network 100. FIG. 3 may illustrate, for example, a block diagram of a system 300. System 300 may comprise, for example, a communications system having multiple nodes, including nodes 110, 120, 130. The node 120 is a wireless client device similar to the D node 130, and is included to merely represent that multiple client devices (D nodes 120, 130) may be in communication with the S node 110 while simultaneously using the secure management connections 142-1-m and the insecure management connections 144-1-n.

Embodiments of system 300 may include one or more fixed, stationary or mobile client devices and network points of attachment, such as the nodes 110, 120, 130 described with reference to FIG. 1. In one embodiment, for example, the nodes 110, 120, 130 may comprise respective radios 160, 162, 164, as described with reference to FIG. 1. In various embodiments, the radios 160, 162, 164 may each comprise WiFi, WiMAX, Bluetooth, Ultra-Wideband (UWB), and/or cellular compliant modules, or any combinations thereof, to communicate over respective wireless networks, for example.

In one embodiment, system 300 nodes 110, 120, 130 may comprise fixed wireless devices. A fixed wireless device may comprise a generalized equipment set providing connectivity, management, and control of another device, such as a mobile client device. Examples for nodes 110, 120, 130 with fixed wireless devices may include a wireless AP, base station or node B, router, switch, hub, gateway, and so forth. In other embodiments, for example, nodes 110, 120, 130 may comprise WiFi WLAN AP, WiMAX broadband wireless base stations, among other technology APs and/or base stations for WLAN, WMAN, wireless personal area network (WPAN), wireless wide area network (WWAN), cellular, and others, for example. Although some embodiments may be described with nodes 110, 120, 130 implemented as a WiFi WLAN access point or WiMAX wireless broadband base station by way of example, it may be appreciated that other embodiments may be implemented using other wireless devices and technologies as well. The embodiments are not limited in this context.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

FIG. 4 illustrates a logic flow 400 in accordance with one or more embodiments. The logic flow 400 may be performed by various systems and/or devices and may be implemented as hardware, software, and/or any combination thereof, as desired for a given set of design parameters or performance constraints. For example, the logic flow 400 may be implemented by a logic device (e.g., processor) and/or logic (e.g., instructions, data, and/or code) to be executed by a logic device. For purposes of illustration, and not limitation, the logic flow 400 is described with reference to FIGS. 1-4.

The logic flow 400 may illustrate various operations for the nodes 110, 120 and 130 of the wireless communications network 100 and/or the wireless communications system 300. As shown in FIG. 4, the logic flow 400 may classify management information for a wireless communications network as MAC security management information or MAC management information at block 402. The logic flow 400 may communicate the MAC security management information over an insecure management connection and the MAC management information over a secure management connection at block 404. The embodiments are not limited in this context.

In one embodiment, the logic flow 400 may classify management information for a wireless communications network as MAC security management information or MAC management information at block 402. For example, the classifying modules 170, 174 may classify management information for the MAC 180, 184 of the wireless communications network 100 as MAC security management information 150 or MAC management information 160. An example for the MAC security management information may include MAC PKM information as used by the WiMAX Specification and/or the IEEE 802.16 Baseline Specification. The MAC PKM information may include any PKM information or messages for a PKM protocol. The PKM protocol may comprise a client/server module between a BS and a subscriber station SS that is used to secure distribution of keying material. For example, assume the nodes 110, 130 are operating as a respective BS, SS. The node 130 may implement a PKM protocol to obtain authentication and traffic keying material from the node 110. In one embodiment, for example, a suitable PKM protocol for the nodes 110, 130 may be defined by the IEEE 802.16e PKMv2 specification, its progeny, revisions and variants.

In one embodiment, the logic flow 400 may communicate the MAC security management information over an insecure management connection and the MAC management information over a secure management connection at block 404. For example, the radios 160, 164 may communicate the MAC security management information 150 over an insecure management connection 144-1-n and the MAC management information 160 over a secure management connection 142-1-m.

In one embodiment, the radios 160, 164 may be arranged to encapsulate the MAC management information 160 in a MPDU prior to communicating the MAC management information 160 over the secure management connections 142-1-m. For example, the radios 160, 164 may encrypt a MPDU including a MAC header and a MAC payload with the MAC management information 160 prior to communicating the MAC management information 160 over the secure management connections 142-1-m. This may be accomplished, for example, using one of the packet formats 202, 204, 206 or 208 as described with reference to respective FIGS. 2A-D.

In one embodiment, the radios 160, 164 may be arranged to encapsulate the MAC security management information 150 in a MSDU prior to communicating the MAC security management information 150 over the insecure management connections 144-1-n. For example, the radios 160, 164 may encrypt a MSDU including a MAC header and a MAC payload with the MAC security management information 150 prior to communicating the MAC security management information 150 over the insecure management connections 144-1-n. This may be accomplished, for example, using one of the packet formats 202, 204, 206, or 208 as described with reference to respective FIGS. 2A-D.

In various embodiments, the nodes 110, 130 may each include other equipment, devices or elements commonly implemented with computer systems or processing systems. For example, the nodes 110, 130 may typically include a computer monitor or display, such as a digital electronic display or an analog electronic display. Examples of digital electronic displays may include electronic paper, nixie tube displays, vacuum fluorescent displays, light-emitting diode displays, electroluminescent displays, plasma display panels, liquid crystal displays, thin-film transistor displays, organic light-emitting diode displays, surface-conduction electron-emitter displays, laser television displays, carbon nanotubes, nanocrystal displays, and so forth. An example for analog electronic displays may include cathode ray tube displays. The embodiments are not limited in this context.

In some cases, various embodiments may be implemented as an article of manufacture. The article of manufacture may include a computer-readable medium or storage medium arranged to store logic and/or data for performing various operations of one or more embodiments. Examples of computer-readable media or storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Examples of what could be claimed include the following:

The invention claimed is:
1. An apparatus, comprising:
a classifier module operative to classify management information for a wireless communications network as media access control security management information or media access control management information;
a wireless transceiver to couple to the classifier module, the wireless transceiver operative to communicate the media access control security management information over an insecure management connection and the media access control management information over a secure management connection, wherein the insecure management connection and the secure management connection comprise separate connections having different connection identifiers, the insecure management connection and the secure management connection each comprise a primary management connection and a basic management connection, and the connection identifier for the insecure management connection comprises a defined offset value from the connection identifier for the secure management connection; and
a security module to encrypt a media access control packet data unit including a media access control header and a media access control payload with the media access control management information prior to communicating the media access control management information.

2. The apparatus of claim 1, the wireless transceiver operative to communicate the media access control management information over multiple secure management connections including a primary management connection and a basic management connection, and the media access control security management information over multiple insecure management connections including an insecure primary management connection and an insecure basic management connection.

3. The apparatus of claim 1, the wireless transceiver operative to communicate the media access control management information over a primary management connection with a primary management connection identifier, and the media access control security management information over an insecure primary management connection with an insecure primary management connection identifier comprising a primary offset value from the primary management connection identifier.

4. The apparatus of claim 1, the wireless transceiver operative to communicate the media access control management information over a basic management connection with a basic management connection identifier, and the media access control security management information over an insecure basic management connection with an insecure basic management connection identifier comprising a basic offset value from the basic management connection identifier.

5. The apparatus of claim 1, the classifier module operative to classify the management information as media access control security management information comprising a media access control privacy key management information type.

6. The apparatus of claim 1, comprising a digital electronic display.

7. A computer-implemented method, comprising:
classifying management information for a wireless communications network as media access control security management information or media access control management information;
communicating the media access control security management information over an insecure management connection and the media access control management information over a secure management connection using one or more wireless transceivers, wherein the insecure management connection and the secure management connection comprise separate connections having different connection identifier the insecure management connection and the secure management connection each comprise a primary management connection and a basic management connection, and the connection identifier for the insecure management connection comprises a defined offset value from the connection identifier for the secure management connection; and
encrypting a media access control packet data unit including a media access control header and a media access control payload with the media access control management information prior to communicating the media access control management information.

8. The computer-implemented method of claim 7, comprising communicating the media access control management information over multiple secure management connections including a primary management connection and a basic management connection, and the media access control security management information over multiple insecure management connections including an insecure primary management connection and an insecure basic management connection.

9. The computer-implemented method of claim 7, comprising communicating the media access control management information over a primary management connection with a primary management connection identifier, and the media access control security management information over an insecure primary management connection with an insecure primary management connection identifier comprising a primary offset value from the primary management connection identifier.

10. The computer-implemented method of claim 7, comprising communicating the media access control management information over a basic management connection with a basic management connection identifier, and the media access control security management information over an insecure basic management connection with an insecure basic management connection identifier comprising a basic offset value from the basic management connection identifier.

11. The computer-implemented method of claim 7, comprising classifying the management information as media access control security management information comprising a media access control privacy key management information type.

12. The computer-implemented method of claim 7, comprising encapsulating the media access control management information in a media access control packet data unit prior to communicating the media access control management information.

13. The computer-implemented method of claim 7, comprising encapsulating the media access control security management information in a media access control service data unit prior to communicating the media access control security management information.

14. An article comprising a non-transitory computer-readable storage medium containing instructions that if executed by a processor enable a system to:
classifying management information for a wireless communications network as media access control privacy key management information or media access control management information;
communicating the media access control privacy key management information over an insecure management connection and the media access control management information over a secure management connection, wherein the insecure management connection and the secure management connection comprise separate connections having different connection identifiers, the insecure management connection and the secure management connection each comprise a primary management connection and a basic management connection, and the connection identifier for the insecure management connection comprises a defined offset value from the connection identifier for the secure management connection; and
encrypting a media access control packet data unit including a media access control header and a media access control payload with the media access control management information prior to communicating the media access control management information.

15. The article of claim 14, further comprising instructions that if executed enable the system to communicate the media access control management information over multiple secure management connections including a primary management connection and a basic management connection, and the media access control privacy key management information over multiple insecure management connections including an insecure primary management connection and an insecure basic management connection.

16. The article of claim 14, further comprising instructions that if executed enable the system to communicate the media access control management information over a primary management connection with a primary management connection identifier, and the media access control privacy key management information over an insecure primary management connection with an insecure primary management connection identifier comprising a primary offset value from the primary management connection identifier.

17. The article of claim 14, further comprising instructions that if executed enable the system to communicate the media access control management information over a basic management connection with a basic management connection identifier, and the media access control privacy key management information over an insecure basic management connection with an insecure basic management connection identifier comprising a basic offset value from the basic management connection identifier.

* * * * *